United States Patent
Stangeland

[19]

[11] Patent Number: 6,116,351
[45] Date of Patent: Sep. 12, 2000

[54] MULTIPLE SECTION REVERSIBLE PLOUGH

[75] Inventor: Kjell-Egil Stangeland, Kleppe, Norway

[73] Assignee: Kverneland Kleep A/S, Kverneland, Norway

[21] Appl. No.: 09/117,403

[22] PCT Filed: Jan. 21, 1997

[86] PCT No.: PCT/GB97/00175

§ 371 Date: Dec. 21, 1998

§ 102(e) Date: Dec. 21, 1998

[87] PCT Pub. No.: WO97/28677

PCT Pub. Date: Aug. 14, 1997

[30] Foreign Application Priority Data

Feb. 8, 1996 [GB] United Kingdom .................... 9602600

[51] Int. Cl.⁷ .................................................. A01B 3/40
[52] U.S. Cl. .......................... 172/225; 172/219; 172/204
[58] Field of Search ................................ 172/314, 219, 172/225, 204, 212, 223

[56] References Cited

U.S. PATENT DOCUMENTS

| | | | |
|---|---|---|---|
| 3,524,509 | 8/1970 | Richey | 172/225 |
| 3,598,185 | 8/1971 | Richey | 172/225 X |
| 3,627,058 | 12/1971 | Johannsen | 172/225 X |
| 4,561,797 | 12/1985 | Aldridge | 172/314 X |
| 4,896,731 | 1/1990 | Besson | 172/314 X |
| 5,314,028 | 5/1994 | Mong | 172/219 |
| 5,381,866 | 1/1995 | Mong | 172/219 |
| 5,685,378 | 11/1997 | Mong | 172/219 X |

FOREIGN PATENT DOCUMENTS

| | | | |
|---|---|---|---|
| 0 318 391 A1 | 11/1988 | European Pat. Off. | 3/46 |
| 0 556 459 A1 | 11/1992 | European Pat. Off. | 3/46 |
| 0 566 821 S1 | 1/1993 | European Pat. Off. | 3/30 |
| 2 201 022 | 9/1973 | France | 3/46 |
| 2 623 686 | 11/1987 | France | 3/46 |
| 2 664 124 | 7/1990 | France | 3/40 |
| 92 04 103 U | 3/1992 | Germany | 3/40 |
| WO 96/24237 | 1/1996 | WIPO | 3/46 |

*Primary Examiner*—Victor Batson
*Attorney, Agent, or Firm*—Workman, Nydegger & Seeley

[57] ABSTRACT

A reversible plough to be towed behind a propelling vehicle has a forward section with a number of pairs of reversible plough bodies and a rear section also having a number of reversible plough bodies. The forward section and rear section are coupled together by a connection portion. A wheelset is mounted to the connection portion and is arranged to support a rear end of the forward section and a forward end of the rear section. A headstock rotatably mounts the forward end of the rear plough to the connection portion and is adjustable in order to vary the inclination of the axis of the rear plough beam to adjust the rear section between a ploughing position and an inoperative transport position. A mounting bracket connected to the forward plough beam of the forward section is rotatably mounted on the connecting frame portion.

11 Claims, 9 Drawing Sheets

MULTIPLE SECTION REVERSIBLE PLOUGH

This invention relates to a multiple section reversible plough which comprises a forward section which is adapted to be coupled with the rear end of a propelling vehicle, a rear section, and a wheel set which supports a rear end of said forward section and also supports a forward end of said rear section, and in which the forward and rear sections have plough beams carrying sets of reversible plough bodies.

Multiple section reversible ploughs of this type are known e.g. from GB2264216 or WO94/24842, and the plough beams of each section take-up a first position for ploughing in one direction, and then are rotated about a generally horizontal axis through about 180°, to take up a second ploughing position for ploughing in a reverse direction. In the first ploughing position, a lowermost one of each pair of reversible plough bodies engages the ground, but upon plough body reversal, by rotation of each plough beam through approximately 180°, what was previously the uppermost plough body of each pair is now moved to a lowermost position, for ploughing in the reverse direction.

The reversal of plough bodies of a multi-section reversible plough will be well known to those of ordinary skill in the art, and need not be described in more detail herein.

The wheel set which supports the rear end of the forward section, and also the forward end of the rear section, may be incorporated in an intermediate plough frame section, which is located between, and which interconnects the forward and rear sections. The intermediate section may have its own set of reversible plough bodies, but more usually the intermediate section forms a relatively short length rearward prolongation of the forward plough section, and without any plough bodies.

It is known to provide a transverse pivot axis i.e. a substantially horizontal axis when the plough is on level ground, and which extends generally perpendicular to the direction of forward travel of the multiple section combination, and in which this transverse pivot axis is located between the rear end of the intermediate section and the forward end of the rear section, and which allows pivotal inclination of the rear section to be adjusted about this axis to suit requirements.

In a semi-mounted reversible plough, it is usual to provide a headstock at the forward end of the forward section, and which forms part of the fixed structure of the plough frame to be coupled with the usual three-point linkage at the rear of a tractor, and to provide a means whereby the plough beam of the forward section can pivot through approximately 180° relative to the headstock at the forward end of the plough beam in order to reverse the plough bodies.

It is also known to provide an arrangement whereby the plough beam of the rear section can rotate through approximately 180° relative to its mounting on the rear end of the intermediate section, in order to reverse its plough bodies.

The invention is concerned with a novel arrangement of a wheel-set supporting portion of a multiple section reversible plough, in which this new arrangement provides an improved means of adjusting the rear section simultaneously with adjustment of the forward section.

A reversible plough according to the invention is defined in claim 1.

Preferred aspects of the invention are set out in claims 2 to 10.

A preferred embodiment of multiple section reversible plough according to the invention will now be described in detail, by way of example only, with reference to the accompanying drawings, in which.

Referring now to the drawings, there will now be described a preferred embodiment of multiple section semi-reversible plough according to the invention, and which comprises a forward section, a rear section, and a wheel set which supports the rear end of the forward section, and also supports the forward end of the rear section. In the illustrated embodiment, the wheel set is incorporated in an intermediate frame section, which interconnects the rear end of the forward section, and also the forward end of the rear section. However, this is one example only, and a multiple section reversible plough according to the invention may be formed by a forward section and a rear section only, and with the wheelset being mounted on a connecting portion of the overall frame of the plough, and which supports the rear end of the forward section, and also the forward end of the rear section.

Figure 2:
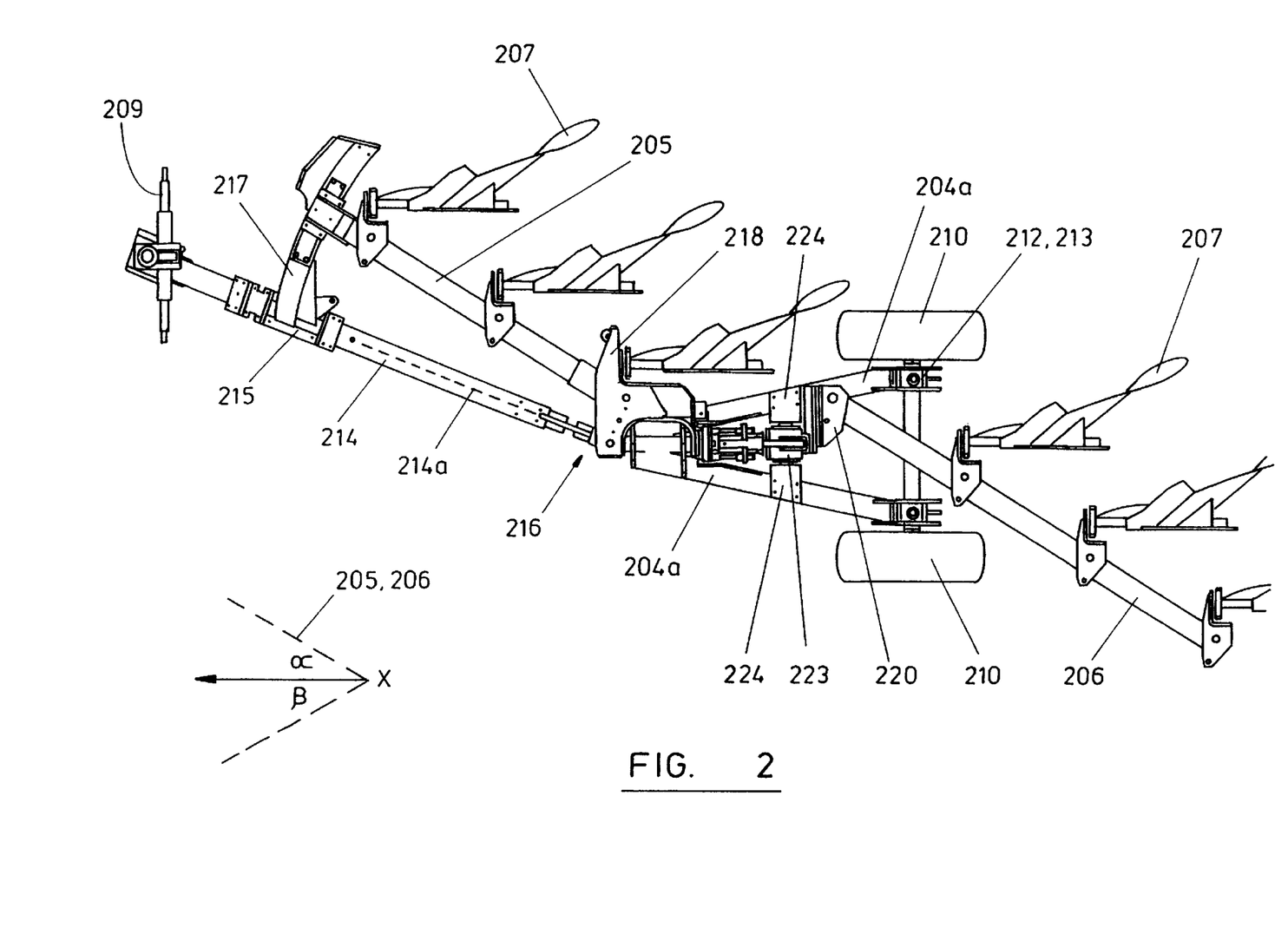
FIG. 2 is a plan view corresponding to FIG. 1.
Figure 3:
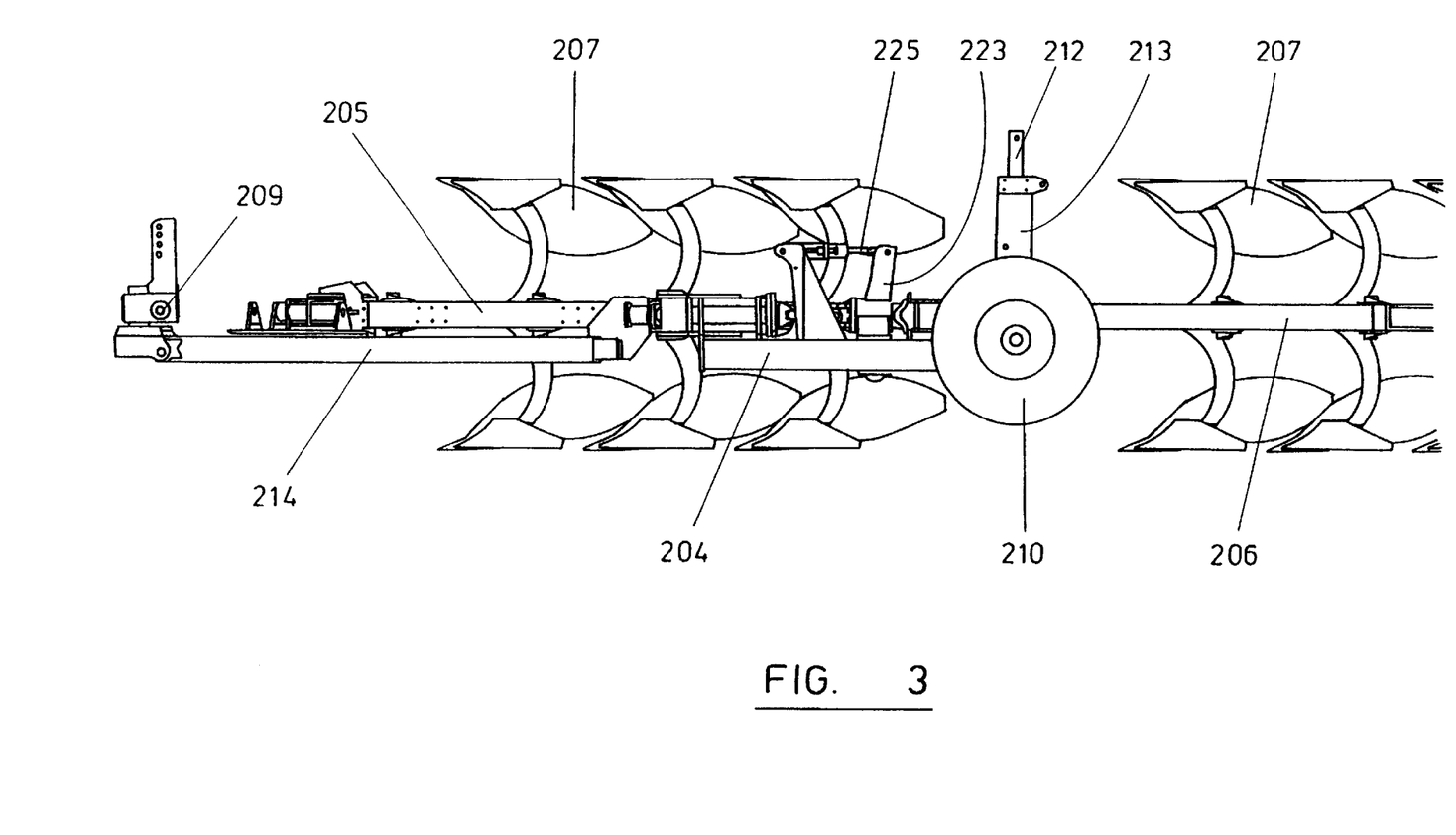
FIG. 3 is a side view.

The construction and operation of a semi-mounted reversible plough will be well known to those of ordinary skill in the art, and therefore need not be described in detail herein. The multiple section reversible plough according to the invention is designated generally by reference 200, and comprises a forward section 201 and a rear section 202, and a wheel set 203 is mounted on a part of the general fixed frame of the plough in order to support the rear end of the forward section 201, and also to support the forward end of the rear section 202. In the illustrated embodiment, the wheelset 203 is mounted on an intermediate frame section 204, which is an A-frame as seen in plan (FIG. 2).

The forward section 201 has a plough beam 205, and the rear section 202 has a plough beam 206, and each plough beam has a number of pairs of reversible plough bodies 207 arranged along its length, and the forward plough beam 205 is adjustably mounted at its forward end in order to carry out rotational adjustment through approximately 180° about a general longitudinal axis of the forward section 201 (substantially parallel to the ground surface), under the action of a hydraulic cylinder (not shown) in order to reverse the plough bodies i.e. in order to move an upper inoperative plough body of each pair in one working position so as to take-up a lower ploughing position in an alternative working position, when it is desired to reverse the plough bodies e.g. after completing one working pass along a field, and prior to carrying out a reverse pass along the field alongside the previously ploughed area. The pivot axis about which the plough beam 206 can rotate is defined by the longitudinal axis of a main frame beam 214 of the forward section 201.

The plough beam 206 of the rear section 202 also is capable of being rotated through approximately 1800 about a general longitudinal axis of the rear section, for the purpose of reversing the plough bodies, but in this case the pivot axis extends generally parallel to the ploughing direction. The means whereby the rear plough beam 206 can be rotated simultaneously with rotation of forward plough beam 205 will be described in more detail below.

The forward end 208 of forward section 201 is adapted to be mounted on pull bars (not shown) of a three-point linkage of a tractor via dragshaft 209, and is also coupled with the top linkage in known manner, to enable plough 200 to be "semi-mounted" at the rear of a tractor or other propelling vehicle.

The intermediate frame portion 204 is supported by wheel set 203, and which comprises a pair of wheels 210 mounted on a common vertically adjustable axle 211, and which are vertically adjustable relative to the frame portion 204 via vertically adjustable support columns 212 which are movable within fixed supports 213. The columns 212 and supports 213 may be incorporated within a support cradle type of structure as shown and described in more detail in GB patent application No 9526530.2, filed Dec. 22, 1995, and the disclosure, of which is incorporated herein by reference.

Upward and downward adjustment of the axle 211 relative to the frame portion 204 allows the height of the rear end of the forward section 201 to be adjusted, and also allows the height of the forward end of the rear section to be adjusted.

Figure 1:
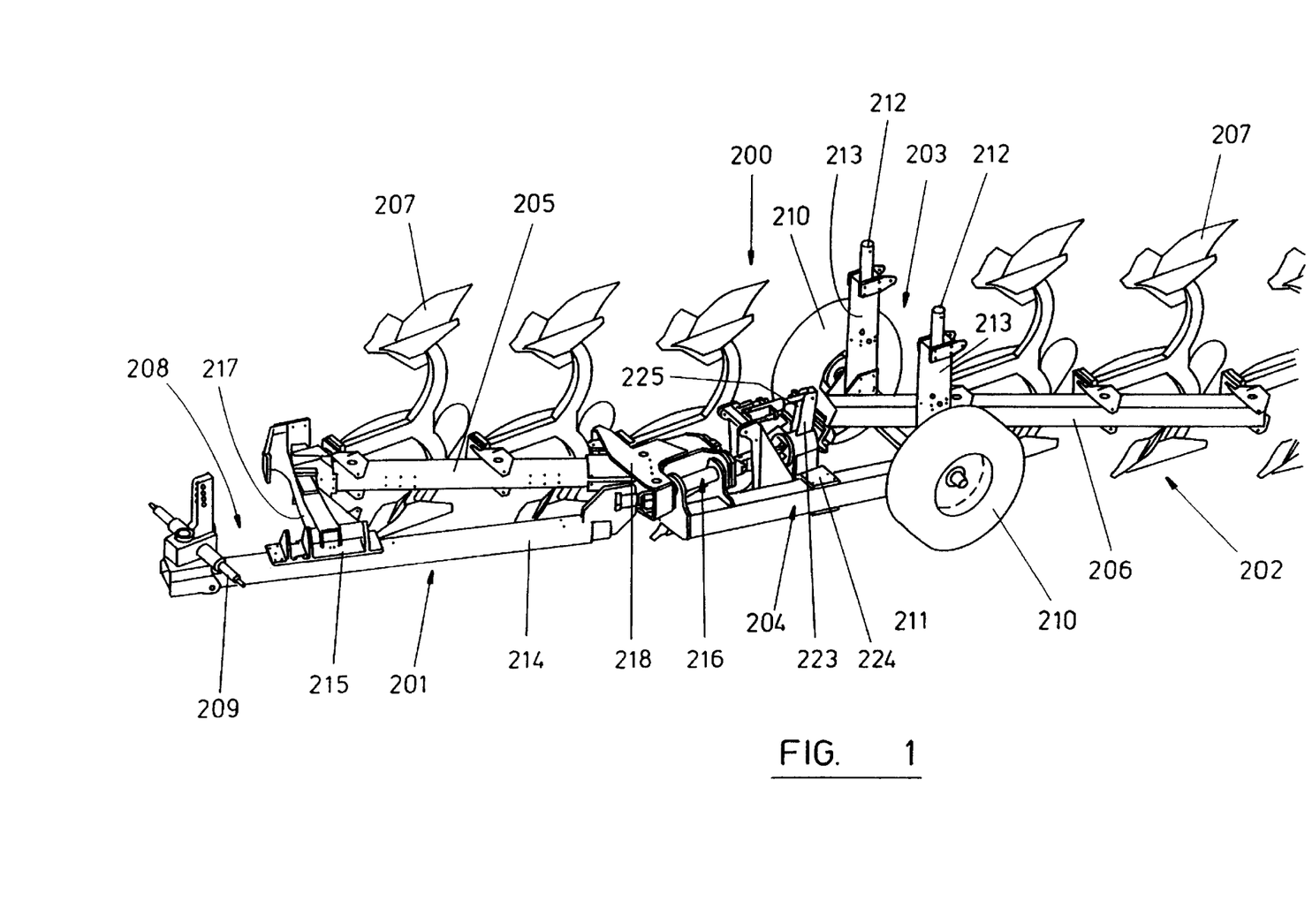
FIG. 1 is a perspective view, from the non-ploughing side, of a multiple section semi-mounted reversible plough according to the invention.

As mentioned above, the forward section 201 has a main frame beam 214 which defines the general longitudinal axis of the forward section, and on which plough beam 205 is rotatably mounted for movement between a right-side ploughing position (as viewed from the rear) as shown in FIG. 1, to a left-side ploughing position (not shown) upon reversal of the plough. The longitudinal pivot axis of the forward section 201 is defined by a forward pivot mounting 215, and also by a rear pivot mounting 216. The forward pivot mounting 215 rotatably mounts a transverse support arm 217 which is slidably connected to a forward end of plough beam 205, and the rear end of plough beam 205 is carried by a rotatably mounted support bracket 218. The bracket 218 is rotatable relative to rear pivot mounting 216, so that arm 217 and bracket 218 allow the plough beam 205 to be rotated through approximately 1800 about the general axis 214*a* (see FIG. 2) of frame portion 214 via front and rear pivot mountings 215 and 216.

The construction of the forward pivot mounting 215 can be seen clearly in FIGS. 1 and 2 of the drawings, and allows forward pivot arm 217 to pivot about the general longitudinal axis of frame portion 214. In addition there is a slidably adjustable connection between pivot arm 217 and the plough beam 205, as shown in FIG. 1B, and this allows lateral adjustment of plough beam 205 relative to frame beam 214 under the action of adjusting cylinder 310 which acts between flanges 311 and 312 mounted on arm 217 and beam 205 respectively.

Figure 1A:
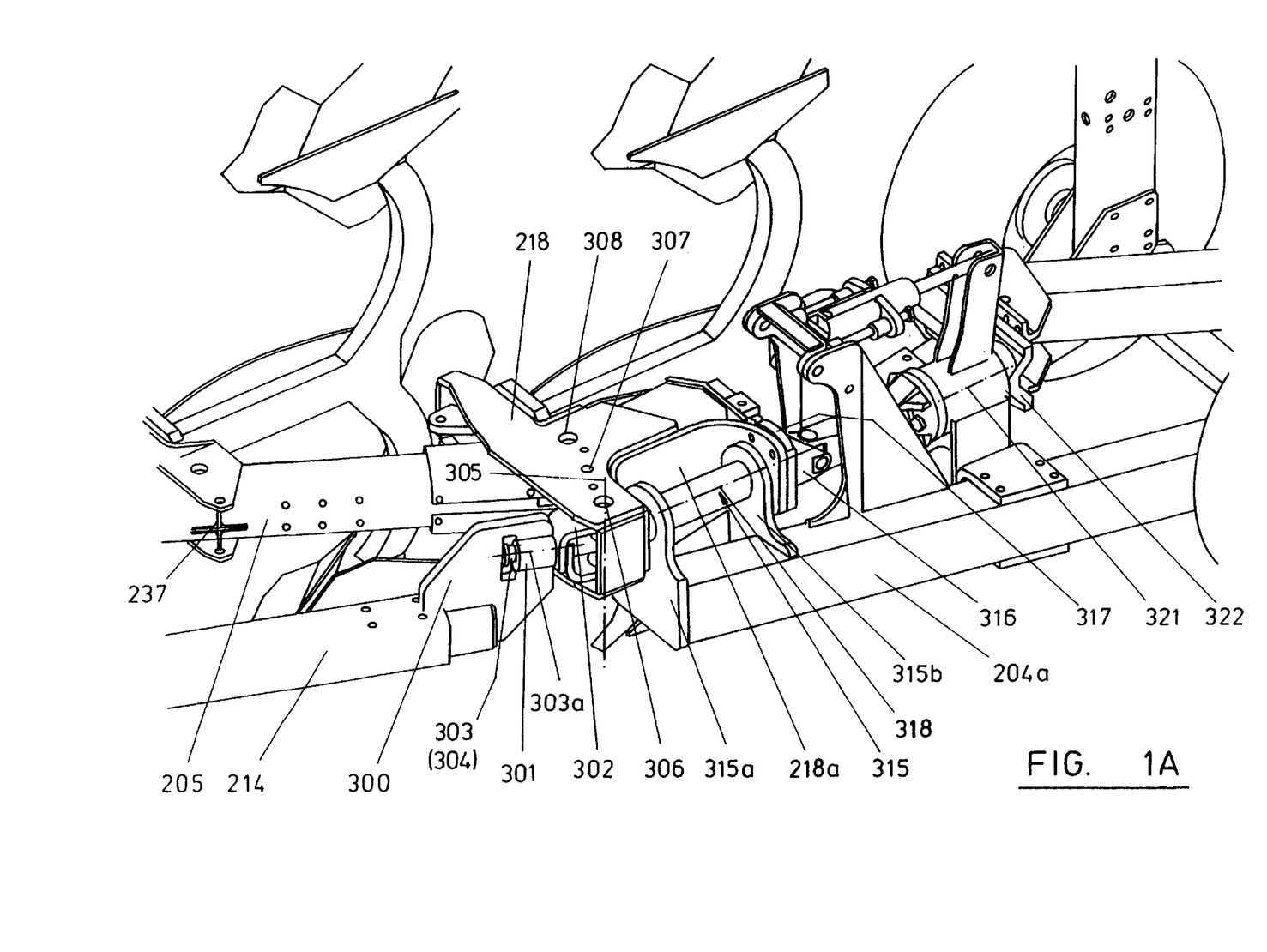
FIG. 1A is a detail view, to an enlarged scale, showing a pivot coupling at the rear end of a forward section of the plough and which permits pivotal adjustment of the forward section for plough body reversal.
Figure 1B:
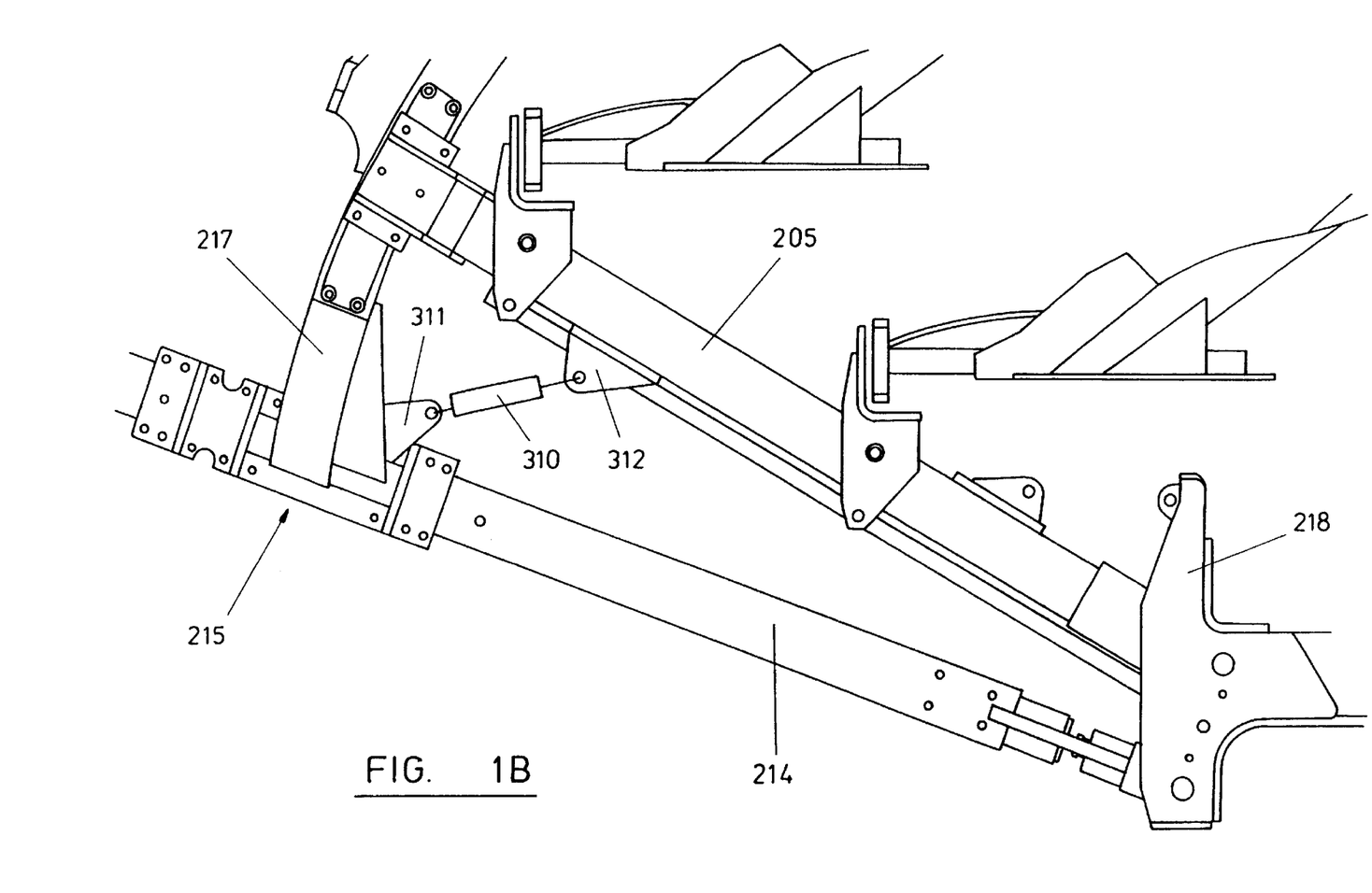
FIG. 1B is a detail view, to an enlarged scale, of a pivot coupling at the forward end of the forward section for plough body reversal, and also showing means for lateral adjustment of the forward end of the section.
Figure 4:
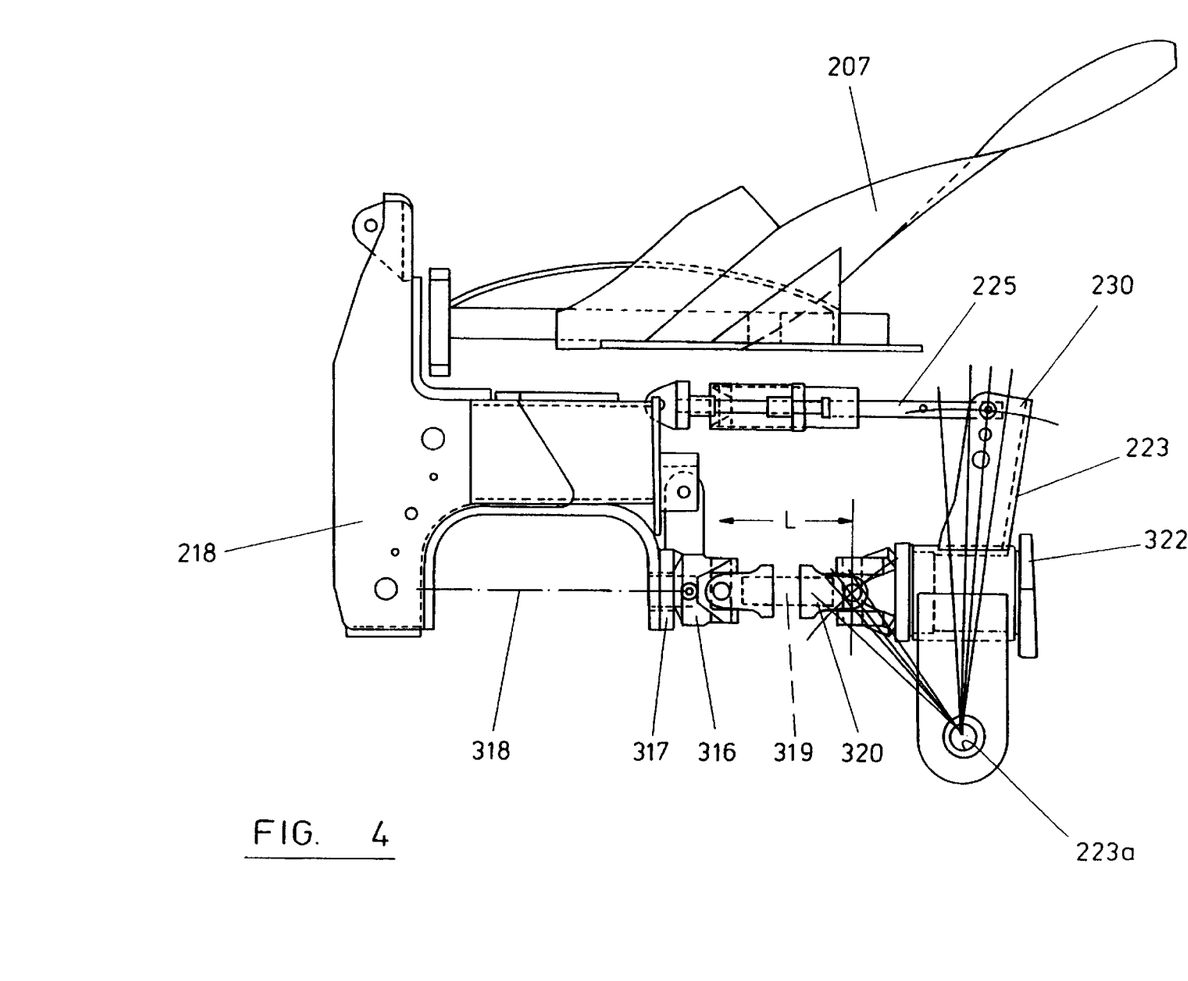
FIG. 4 is a detail side view of part of a headstock assembly provided at a connection portion of the plough frame between the forward and rear plough sections.

However, the construction and mounting assembly of adjusting bracket 218 via its mounting on the rear pivot mounting 216 is more complicated, since not only does rear pivot mounting 216 permit rotating movement of the bracket 218 and the rear end of plough beam 205 about the general axis of frame beam 214, but it also serves to transmit rotary adjustment movement to the rear plough beam 206 of the rear plough section 202, via a shaft/universal joint drive train (316, 319, 320, 321) which is described in more detail below with reference to FIG. 1A and FIG. 4.

It will be appreciated that, upon plough body reversal, not only will each plough beam 205 and 206 be rotated through approximately 180°, but in addition relative lateral adjustment of the forward and rear plough sections will take place, relative to the dragshaft 209. Thus, as can be seen in the plan view of FIG. 2, the plough beams 205 and 206 extend generally parallel to each other, and obliquely at an angle a with respect to the ploughing direction X, but upon adjustment of the plough bodies 205 and 206, to reverse the plough bodies, the entire plough assembly pivots about a generally vertical axis and moves laterally relative to the dragshaft 209, so that plough frame portion 214, and plough beams 205 and 206 then take-up a position, as seen in plan, which is inclined with respect to the ploughing direction X at angle β, as shown in the detail illustration schematically on FIG. 2. The frame beam 214 therefore pivots relative to its forward end mounting, and carries out lateral displacement which is automatically followed by the connecting frame portion 204 and its supporting wheelset 203 during turning movement of the tractor and multiple section plough in the usual "headland" prior to a reverse ploughing operation.

Therefore, the rear pivot coupling 216 has to be designed so as to be capable of permitting this translational adjustment movement during plough body reversal, and also permitting rotational adjustment of plough beam 205, and transmission of rotary adjusting movement also to the forward end of rear plough beam 206, in a manner to be described in more detail below.

The rear pivot mounting 216 will therefore now be described in more detail. Essentially, it performs a dual function, namely: (a) it allows adjusting bracket 218 to rotate about the longitudinal axis 214*a* of frame beam 214; and, (b) it transmits rotary drive (via the rotary drive train 316, 319, 320, 321) to adjust the forward end 220 of rear plough beam 206 to rotate through approximately 180°, to reverse the plough bodies of the rear section 202.

Referring now in particular to FIG. 1A, this shows the construction of the forward pivot mounting 216 in more detail. The rear end of main frame beam 214 includes a vertical connecting plate 300, having a bush 301 welded to it. A bearing pin 303 is received within a sleeve bearing within the bush 301, and bearing pin 303 is carried by a connecting part 302 which may be a compact block with an integrated journal pin (303). A groove is formed in one end of the bearing pin 303, and the pin 303 is secured against axial movement via a stop ring 304 which fits into the groove.

During forward movement of the plough 200, the traction force of the propelling vehicle is transmitted through the dragshaft 209 and then to the main frame beam 214. Traction is then transmitted to the following parts of the multiple section plough via the frame beam 214, stop ring 304, and connecting part 302.

The connecting part 302 is pivotally connected to adjusting bracket 218 via a vertical pivot pin (not shown, but whose pivot axis is shown by reference 305) which is taken through aligned holes 306 formed in upper and lower plates of the bracket 218, and also is taken through a vertical bore in the connecting part 302. The connecting part 302 therefore can pivot about the axis 305 during the lateral adjusting movement of frame beam 214 which takes place during plough body reversal when the tractor and plough combination is turning in the usual "headland" before carrying out a return ploughing action through the field. The plough beam 205 is pivotally connected at its rear end to the adjusting bracket 218, via a vertical pivot pin (not shown) taken through mounting holes 308 formed in the bracket 218.

Figure 6:
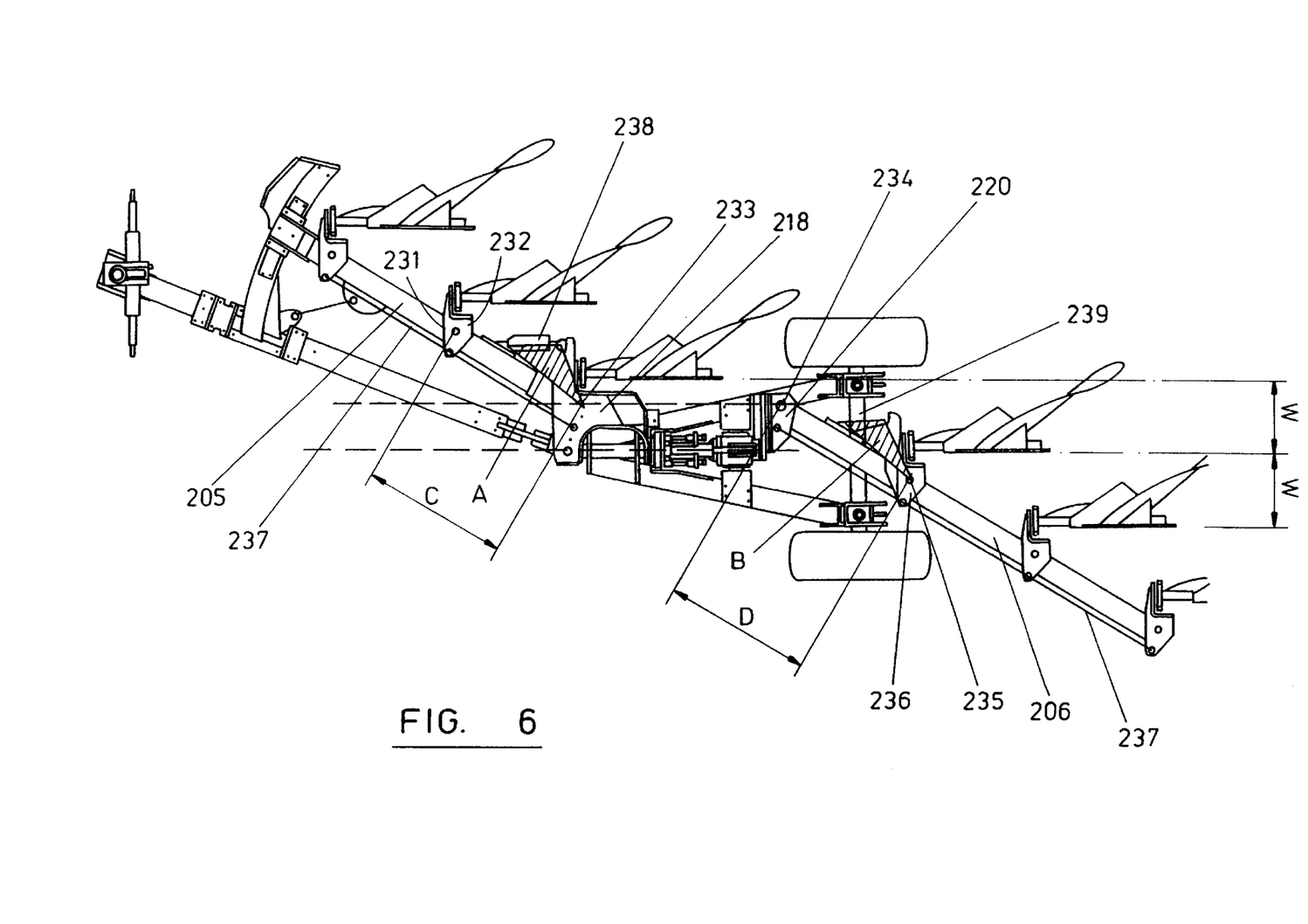

As shown in FIG. 6, and as will be described in more detail later, adjusting rods 237 extend alongside each of the plough beams 205 and 206, and are connected pivotally to mounting brackets which carry the plough bodies 207, and operation of the rods 237 provides pivotable adjustment of the brackets relative to the plough beams, to provide necessary adjustment of the plough bodies. The adjusting rod 237 associated with forward plough beam 205 is pivotally connected to the adjusting bracket 218 via a vertical pivot pin taken through mounting holes 307 formed in the bracket 218.

Referring again now to FIG. 1B, the forward end of the plough beam 205 is slidably connected to pivot arm 217, and lateral pivotal adjustment of plough beam 205 relative to main frame beam 214 can take place about the pivotal connection (308) at the rear end of the plough beam 205 under the action of adjusting cylinder 310.

When the plough has been adjusted to take-up a new ploughing position, the pivot mounting 216 is rigid in the sense that it prevents relative vertical movement between the forward section 201 and the rear section 202. However, it is possible to carry out joint adjustment movement of the plough beam 205 and the main frame beam 214 laterally, under the control of a hydraulically operated adjusting mechanism which will be described in more detail below, with reference to FIG. 6. Briefly, it will be mentioned at the moment that main frame beam 214 can pivot about the axis 305 and plough beam 205 can pivot about the axis of the mounting holes 308 during this adjustment. Furthermore, the adjusting rod 237 associated with forward plough beam 205 can pivot about the axis of the mounting holes 307.

The rear section 202 of the plough, having rear plough beam 206 and associated actuator rod 237, can be adjusted in the same manner under the action of slave cylinder 220, which also will be described in more detail below with reference to FIG. 6.

Figure 1C:
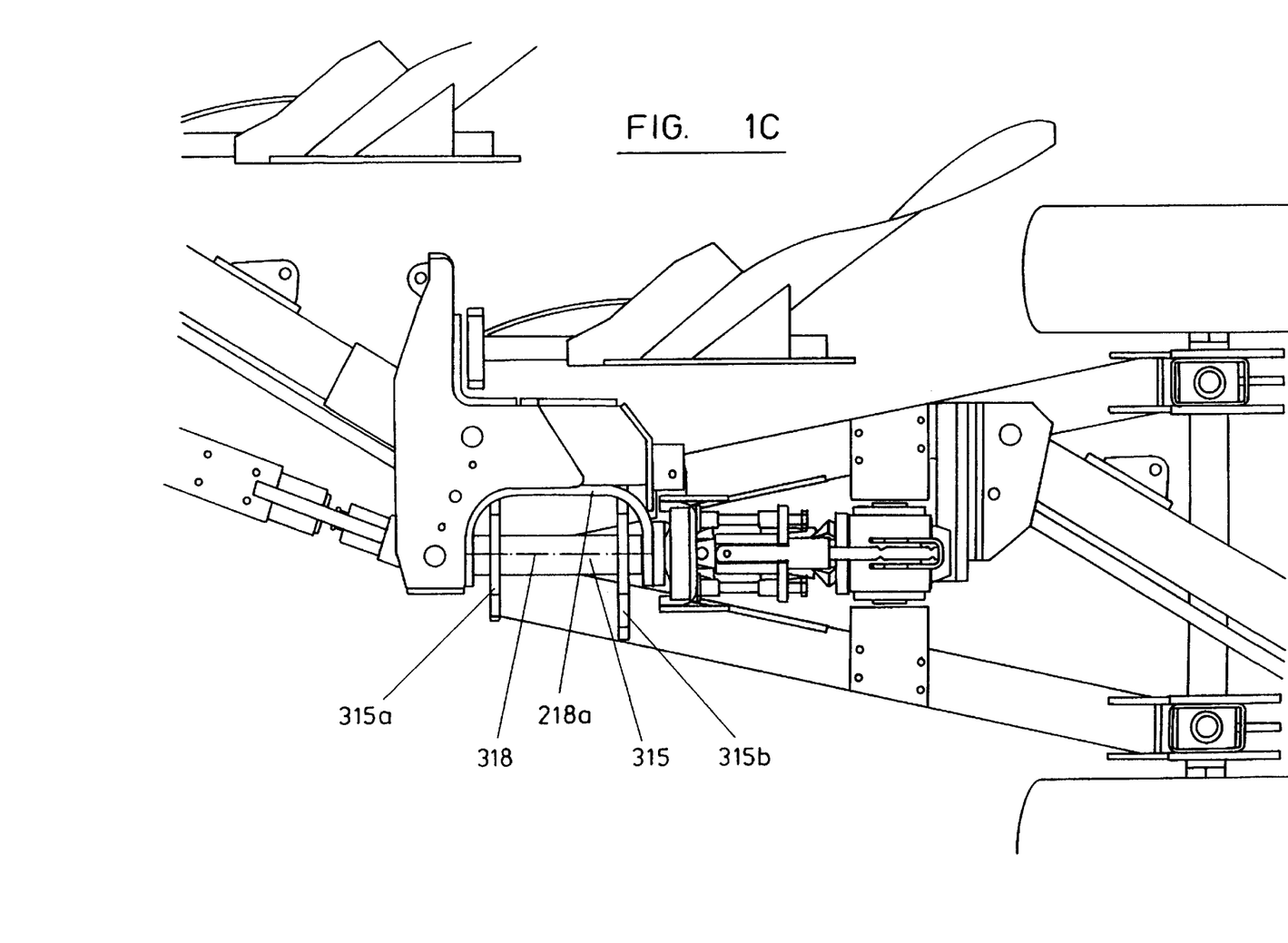
FIG. 1C is a detail plan view, corresponding to FIG. 1A.

Returning now to the construction of adjusting bracket 218, this is pivotally mounted on the connecting frame portion 204 via the pivot mounting 216, and in particular by pivotally mounting the bracket 218 on a mounting bracket assembly 315 which is rigidly mounted on one of the beams 204*a* of the connecting frame portion 204. The bracket assembly 315 comprises longitudinally spaced mounting plates 315*a* and 315*b*, welded to beam 204*a*, and between which there extends a sleeve 315*c* which is welded at each end to the plates 315*a* and 315*b*. The sleeve 315*c* mounts bearings internally at each end thereof, and a shaft 318 is mounted within sleeve 315. The shaft 318 is taken through the sleeve 315, its forward end lies adjacent to but is not connected with the connecting part 302. However, its rear end is coupled with a universal joint 316 which forms part of a rotary drive train for transmitting rotation to the forward end 220 of the rear plough beam 206, via a rotary coupling provided internally of the headstock 223. The universal joint 316 may be of standard construction, and is welded to a plate 317 which, in turn, is bolted to the adjusting bracket 218. The axle 318 therefore extends through the sleeve 315, and is mounted rotatably therein via the internal bearings in the sleeve 315, but also axle 318 extends axially beyond the plates 315*a* and 315*b*, as can be seen in FIG. 1C, so as to be mounted in a U-shaped mounting bracket 218*a* which is rigidly secured to the adjusting bracket 218. Therefore, adjusting bracket 218, plate 317, universal joint 316 and axle 318 are coupled rigidly together, so as to be pivotable together as a unit during rotary adjustment of bracket 218 during plough body reversal.

Thus, when the forward section 201 undergoes plough body reversal, the plough beam 205 rotates about the axis 214*a* of the frame beam 214, via forward pivot coupling 215 and rear pivot coupling 216, and this causes adjusting bracket 218 to rotate about the axis of axle 318. The rear pivot mounting 216 therefore allows this pivotable adjusting movement of the forward plough beam 205 for the purposes of plough body reversal, but in addition the pivot mounting 216 also allows a separate rotary drive train to cause simultaneous rotation of rear plough beam 206 about an axis which extends generally parallel to the ploughing direction X, and substantially parallel to the ground surface, via a rotatable coupling between the forward end 220 of the plough beam 206 and the headstock 203. This rotary drive train will now be described in detail with reference to FIG. 4. The rotary drive train therefore includes a splined axle 319 which is coupled with the universal joint 316, and which is axially slidable within a splined socket within a rear universal joint 320. The rear universal joint 320 is secured to an axle 321 which extends internally of the headstock 223, and a mounting bracket at the forward end 220 of the rear plough beam 206 is coupled with axle 321. Therefore, rotation of adjusting bracket 218 through approximately 180° about the axis of the axle 318 causes corresponding pivotal adjustment of the mounting bracket which carries the forward end 220 of the rear plough beam 206, so that simultaneous plough body reversal adjustment takes place.

The headstock 223 can be of any suitable construction, and indeed may be of standard design. However, instead of using a standard type of "turn-over linkage" for the purposes of plough body reversal, there is instead provided the rear universal joint 320, axle 321, and a slide 322 by means of which a mounting bracket at the forward end 220 is fastened by clamping with bolts.

The splined interconnection between axle 319 and rear universal joint 320 permits the headstock 223 to carry out a pivotal adjustment about its lower pivot axis 223*a* (FIG. 4) under the action of adjusting movement of top link 225, which is described in more detail below. Thus, the distance L between the forward universal joint 316 and the rear universal joint 320 can be allowed to vary, during adjustment of the inclination of the axis of the rear plough beam 206 under the action of the headstock 223, and in particular when the rear section 202 is lifted to the transport position.

As can be seen in the plan view of FIG. 2, the connecting frame portion 204 effectively comprises an A-frame, and this forms a rigid support platform which is supported at its rear end by the wheelset 203, and its forward end is coupled with the rear end of the forward section 201 via pivot mounting 215, and bracket 218. The headstock 223 is mounted on two inclined beams 204*a* of the A-frame 204 via a pair of laterally spaced rigid supporting brackets 224, and these give structural support for the headstock 223, and in particular give firm lateral support. This is an improvement over previous proposals, involving the use of a pair of lower pivoted links. Although not shown in the drawings, the rear end of plough beam 206 will be supported by a trailing ground wheel.

The headstock 223 is coupled with an adjustable length top link 225, which allows the inclination to the vertical of the headstock 223 to be adjusted, for the purposes of adjusting the inclination of the axis of rear plough beam 206.

Figure 5:
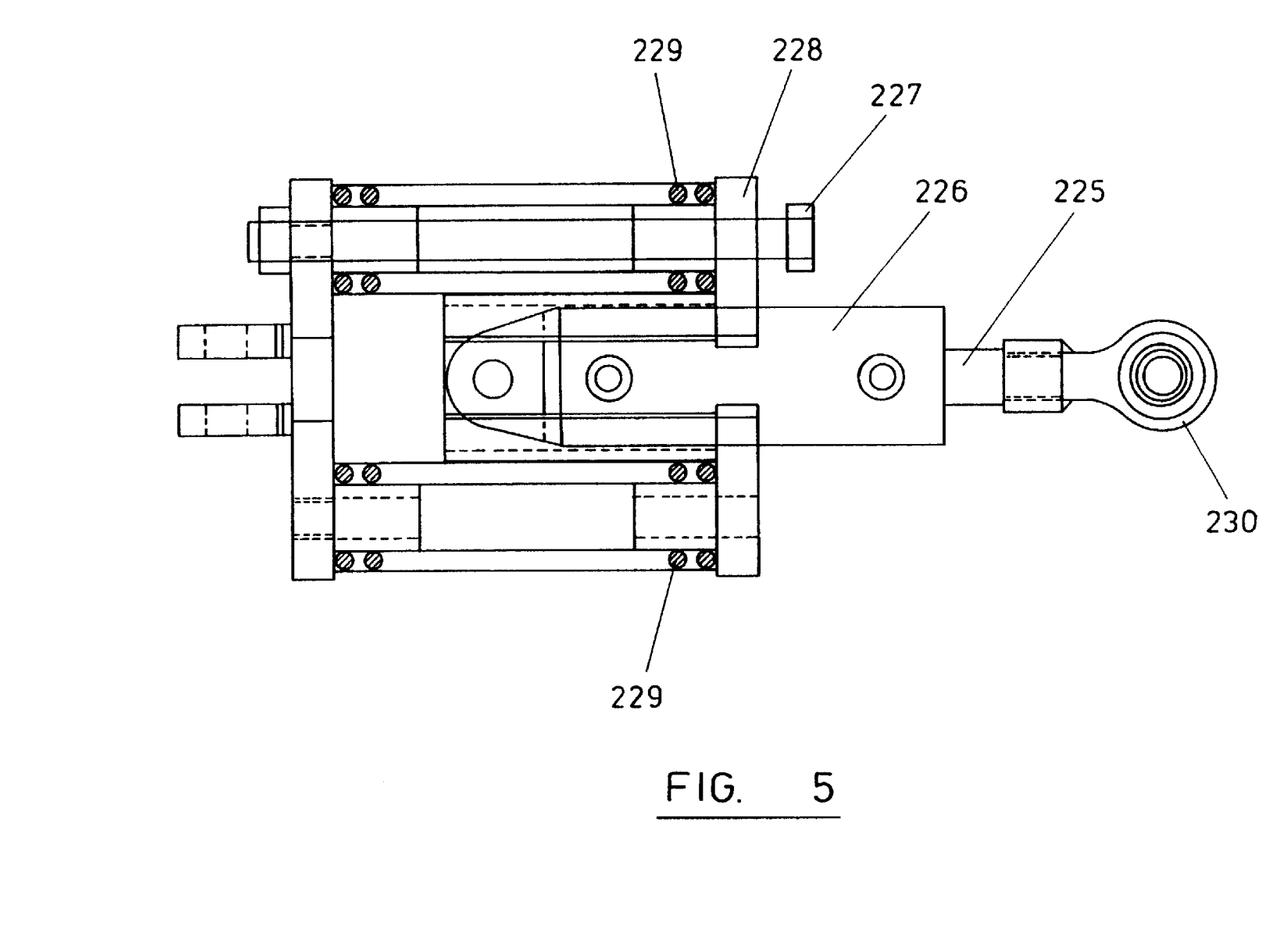
FIG. 5 is a detail view of a spring-loaded actuator cylinder arrangement for operating the assembly shown in FIG. 4; and, FIG. 6 is a schematic plan view, similar to FIG. 2, illustrating schematically a hydraulically controlled adjustment arrangement for adjusting the width between successive ploughshares of both the forward and the rear sections simultaneously.

The adjustment of the top link 225 is under the control of a hydraulic cylinder, but there is also a spring-loading of this adjustment, the construction and operation of which will now be described with reference to FIGS. 4 and 5. Also, FIG. 4 shows the adjusting bracket 218 in a middle (transport) position between left side and right side ploughing. For convenience, the spring loading detail is omitted from FIG. 4, but is shown in more detail in FIG. 5. The headstock 223 is therefore pivotally adjusted through a relatively small angle either side of the vertical plane, under the combined action of a spring arrangement, and also an actuator cylinder. The actuator cylinder is shown by reference 226, but the cylinder 226 will only be actuated when it is required to raise the plough beam 206 of the rear section to a transport position. During normal ploughing operation, the ploughing depth of the plough bodies 207 is controlled by the vertical adjustment of the wheels 210 of the wheelset 203 at the forward end of the rear section 202, and also by the depth control wheel at its rear end. A limited degree of "floating" movement is permitted, against spring preloading, by reason of the clearance between an adjustable stop 227 and the mounting bracket 228. Compression springs 229 therefore give spring loading to the assembly, and therefore apply compressive thrust via the cylinder 226 and the link 225 to the upper end 230 of the headstock 223 and which tends to maintain the plough bodies 207 at the right depth in the ground, even when the plough section is moving through undulating ground.

However, when it is required to raise the rear plough beam 206 under the action of the cylinder 226, the clearance between adjustable stop 227 and bracket 228 is first taken-up, and then further retraction of the cylinder 226 applies a pulling force to the upper end 230 of the headstock 223 so that the latter pivots in an anti-clockwise direction, about its lower pivot shown in FIG. 4, in order to raise the rear plough beam 206.

With regard to the vertical adjustment of the forward end of rear plough beam 206, this is obtained by vertical adjustment of the wheels 210 of the wheelset 203, and conveniently slide bearings with the supports 213 permit relative vertical movement of the support columns 212. Hydraulic actuating cylinder (not shown) may be provided to carry out this necessary vertical adjustment of the wheels.

In addition to the new arrangement shown in the drawings providing joint actuation of the forward and rear plough beams 205 and 206, to carry out plough body reversal, the preferred embodiment of the invention also has a hydraulically controlled adjusting arrangement for providing joint adjustment of the ploughing widths between successive plough bodies, of both the forward and the rear sections. Referring now to FIG. 6, this is a plan view, generally corresponding with FIG. 2, but including schematic illustration of a hydraulically controlled adjusting mechanism for adjusting the ploughing widths between successive plough bodies.

As shown in FIG. 6, the ploughing width i.e. the lateral spacing between successive ploughshares (successive shares being measured in a direction parallel to the ploughing direction) is shown by reference W. Reference C is the distance, measured along the forward plough beam 205, between the pivot point 231 of a mounting bracket 232 and the pivot point 233 of the plough beam 205 on bracket 218, whereas distance D is the length, measured along the rear plough beam 206, between forward pivot 234 of forward bracket 220 on which the forward end of rear plough beam 206 is pivotally mounted and to the pivot point 235 of mounting bracket 236.

The pairs of plough bodies 207 are carried by respective mounting brackets which are pivotally mounted on the respective plough beams, in known manner, and which are coupled together for joint adjustment under the action of adjusting rods 237, pivoted to the mounting brackets. Evidently, lengthwise adjustment of the rods 237 will cause pivotal adjustment of the mounting brackets which will each pivot through the same angle, to provide joint adjustment of all of the ploughing widths between successive plough bodies. Evidently, following adjustment of the brackets, the entire multiple section reversible plough automatically adjusts itself relative to the dragbar 209, so that the plough bodies align themselves with the ploughing direction, and take-up a new position of width adjustment one relative to the other.

Evidently, in a multiple section reversible plough arrangement, it will be desirable to provide an adjustment mechanism which allows a single input adjustment to cause corresponding adjustment of the plough widths of successive plough bodies of all of this plough section. A master cylinder 238 forms part of a hydraulically operated control mechanism; and is coupled with part of the adjusting mechanism associated with the forward plough beam 205, whereas a slave cylinder 239 forms part of an adjustment mechanism which controls the adjustment of the plough bodies of the rear plough beam 206. Therefore, upon application of suitable input adjustment control to the master cylinder 238, this causes a corresponding adjustment of the ploughing widths between successive plough bodies of the forward section, but the same adjustment movement is transferred to the slave cylinder 239, which causes the same extent of adjustment movement of the width between successive plough bodies of the rear section.

The master cylinder 238, and slave cylinder 239 can each be considered to form part of an imaginary triangle, shown by hatched representations A and B in FIG. 6, such triangles being of equal size and equal shape. The geometry of the arrangement on the front part is identical to the geometry on the rear part, and with the lengths C and D being equal, the angles of the front plough beam 205 and the rear plough beam 206 will always be maintained equal to each other.

In the illustrated embodiment of the invention, a set of three pairs of reversible plough bodies is provided on the front plough beam 205, and a similar number of pairs of plough bodies may be provided on the rear plough beam 206. However, it should be understood that the number of pairs of plough bodies is not critical to the invention, if a greater number of pairs of plough bodies is required, then is a simple matter merely to increase the length of either or both of the plough beams 205 and 206. The wheelset 203 supports the rear end of the forward section 201, and also supports the forward end of the rear section 202, and most conveniently this is achieved by providing connecting frame portion 204. The wheelset 203 is arranged at or near to the rear end of the connecting frame portion 204, whereas the pivot mounting assembly (216) which rotatably mounts the forward plough beam 205 of the forward section 201, is mounted at the forward end of connecting frame portion 204.

What is claimed is:

1. A reversible plough which is intended to be mounted on and towed behind a propelling vehicle and which comprises:
a forward section having a forward plough beam provided with a number of pairs of reversible first plough bodies spaced apart along the forward plough beam, said forward plough beam having a forward end which is adjustably mounted in order to move an upper inoperative portion of the first plough bodies to a lower ploughing position in order to reverse the first plough bodies;

a rear section having a rear plough beam provided with a number of pairs of reversible second plough bodies arranged along the rear plough beam, said rear plough beam having a forward end which is adjustably mounted to move an upper inoperative portion of the second plough bodies to a lower ploughing position in order to reverse the second plough bodies;

a wheelset arranged to support a rear end of said forward section, and also to support a forward end of said rear section;

a connecting frame portion which interconnects said forward section and said rear section, said frame portion having said wheelset mounted thereon;

means for rotatably mounting the forward end of the rear plough beam to the connecting frame so as to permit rotation of the rear plough beam through an angle of approximately 180° in order to reverse the second plough bodies, and for varying the inclination of the rear plough beam to adjust the rear section between a ploughing position and an inoperative transport position, said connecting frame comprises a pair of separate support beams on which said means for rotatably mounting the forward end of the rear plough is mounted via respective securing brackets;

a mounting bracket connected to said forward plough beam of the forward section, said bracket being rotatably mounted on said connecting frame portion to allow said forward plough beam to be rotated through approximately 180° in order to reverse the first plough bodies; and, means for rotatably mounting said bracket on said connecting frame portion and also providing a drive coupling to the forward end of said rear plough beam, whereby joint adjustment rotation of said forward plough beam and said rear plough beam can take place in order to reverse the plough bodies of the forward and rear sections simultaneously.

2. A reversible plough according to claim 1, in which a shaft assembly is coupled with said means for rotatably mounting said bracket on said connecting frame portion.

3. A reversible plough according to claim 2, in which said shaft assembly includes a driveshaft and at least one universal joint.

4. A reversible plough according to claim 3, in which a forward end of the driveshaft is coupled with said mounting bracket to be rotated by the mounting bracket when the forward plough beam is adjusted to carry out reversal of the first plough bodies.

5. A reversible plough according to claim 4, in which said mounting bracket is coupled with said drive shaft via a first universal joint, and said drive shaft is coupled via a second universal joint with a second drive shaft which is mounted in said means for rotatably mounting.

6. A reversible plough according to claim 1, in which the connecting frame portion comprises an A-frame, as seen in plan, in which the apex of the A-frame is located forwardly, and serves to rotatably mount said mounting bracket, and in which a rear end of the A-frame is supported by said wheelset.

7. A reversible plough which is intended to be mounted on and towed behind a propelling vehicle and which comprises:

a forward section having a forward plough beam provided with a number of pairs of reversible first plough bodies spaced apart along the forward plough beam, said forward plough beam having a forward end which is adjustably mounted in order to reverse the first plough bodies;

a rear section having a rear plough beam provided with a number of pairs of reversible second plough bodies arranged along the rear plough beam, said rear plough beam having a forward end which is adjustably mounted in order to reverse the second plough bodies;

a connecting frame portion which interconnects said forward section and said rear section, the connecting frame including a pair of separated support beams;

a wheelset mounted to the connecting frame, the wheelset being arranged to support a rear end of the forward section and the forward end of the rear section;

a headstock mounted to the separated support beams via respective securing brackets, the headstock mounting the forward end of the rear plough beam to the connecting frame so as to permit rotation of the rear plough beam through an angle of approximately 180° in order to reverse the second plough bodies, the headstock also being adjustable in order to vary the inclination of the rear plough beam to adjust the rear section between a ploughing position and an inoperative transport position;

a mounting bracket connected to said forward plough beam of the forward section, said bracket being rotatably mounted on said connecting frame portion to allow said forward plough beam to be rotated through approximately 180° in order to reverse the first plough bodies; and means for rotatably mounting said bracket on said connecting frame portion and also providing a drive coupling to the forward end of said rear plough beam, whereby joint adjustment rotation of said forward plough beam and said rear plough beam can take place in order to reverse the plough bodies of the forward and rear sections simultaneously.

8. A reversible plough which is intended to be mounted on and towed behind a propelling vehicle and which comprises:

a forward section having a forward plough beam provided with a number of pairs of reversible first plough bodies spaced apart along the forward plough beam, said forward plough beam having a forward end which is adjustably mounted in order to reverse the first plough bodies;

a rear section having a rear plough beam provided with a number of pairs of reversible second plough bodies arranged along the rear plough beam, said rear plough beam having a forward end which is adjustably mounted in order to reverse the second plough bodies;

a connecting frame portion which interconnects said forward section and said rear section;

a wheelset mounted to the connecting frame, the wheelset being arranged to support a rear end of the forward section and the forward end of the rear section;

a headstock mounting the forward end of the rear plough beam to the connecting frame so as to permit rotation of the rear plough beam through an angle of approximately 180° in order to reverse the second plough bodies, the headstock also being adjustable in order to vary the inclination of the rear plough beam to adjust the rear section between a ploughing position and an inoperative transport position;

a spring loaded hydraulic actuator coupled with a top link connected to an upper end of the headstock;

a mounting bracket connected to said forward plough beam of the forward section, said bracket being rotatably mounted on said connecting frame portion to allow said forward plough beam to be rotated through approximately 180° in order to reverse the first plough bodies; and means for rotatably mounting said bracket on said connecting frame portion and also providing a drive coupling to the forward end of said rear plough beam, whereby joint adjustment rotation of said forward plough beam and said rear plough beam can take place in order to reverse the plough bodies of the forward and rear sections simultaneously.

9. A reversible plough which is intended to be mounted on and towed behind a propelling vehicle and which comprises:

a forward section having a forward plough beam provided with a number of pairs of reversible first plough bodies spaced apart along the forward plough beam, said forward plough beam having a forward end which is adjustably mounted in order to move an upper inoperative portion of the first plough bodies to a lower ploughing position in order to reverse the first plough bodies;

a rear section having a rear plough beam provided with a number of pairs of reversible second plough bodies arranged along the rear plough beam, said rear plough beam having a forward end which is adjustably mounted to move an upper inoperative portion of the second plough bodies to a lower ploughing position in order to reverse the second plough bodies;

a wheelset arranged to support a rear end of said forward section, and also to support a forward end of said rear section;

a connecting frame portion which interconnects said forward section and said rear section, said frame portion having said wheelset mounted thereon;

means for rotatably mounting the forward end of the rear plough beam to the connecting frame so as to permit rotation of the rear plough beam through an angle of approximately 180° in order to reverse the second plough bodies, and for varying the inclination of the rear plough beam to adjust the rear section between a ploughing position and an inoperative transport position;

a mounting bracket connected to said forward plough beam of the forward section, said bracket being rotatably mounted on said connecting frame portion to allow said forward plough beam to be rotated through approximately 180° in order to reverse the first plough bodies;

means for rotatably mounting said bracket on said connecting frame portion and also providing a drive coupling to the forward end of said rear plough beam, whereby joint adjustment rotation of said forward plough beam and said rear plough beam can take place in order to reverse the plough bodies of the forward and rear sections simultaneously; and a spring loaded hydraulic actuator coupled with a top link connected to the means for rotatably mounting the forward end of the rear plough beam.

10. A reversible plough which is intended to be mounted on and towed behind a propelling vehicle and which comprises:

a forward section having a forward plough beam provided with a number of pairs of reversible first plough bodies spaced apart along the forward plough beam, said forward plough beam having a forward end which is adjustably mounted in order to move an upper inoperative portion of the first plough bodies to a lower ploughing position in order to reverse the first plough bodies;

a rear section having a rear plough beam provided with a number of pairs of reversible second plough bodies arranged along the rear plough beam, said rear plough beam having a forward end which is adjustably mounted to move an upper inoperative portion of the second plough bodies to a lower ploughing position in order to reverse the second plough bodies;

a wheelset arranged to support a rear end of said forward section, and also to support a forward end of said rear section;

a connecting frame portion which interconnects said forward section and said rear section, said frame portion having said wheelset mounted thereon;

means for rotatably mounting the forward end of the rear plough beam to the connecting frame so as to permit rotation of the rear plough beam through an angle of approximately 180° in order to reverse the second plough bodies, and for varying the inclination of the rear plough beam to adjust the rear section between a ploughing position and an inoperative transport position;

a mounting bracket connected to said forward plough beam of the forward section, said bracket being rotatably mounted on said connecting frame portion to allow said forward plough beam to be rotated through approximately 180° in order to reverse the first plough bodies;

means for rotatably mounting said bracket on said connecting frame portion and also providing a drive coupling to the forward end of said rear plough beam, whereby joint adjustment rotation of said forward plough beam and said rear plough beam can take place in order to reverse the plough bodies of the forward and rear sections simultaneously; and a hydraulically controlled adjustment mechanism having a master cylinder and a slave cylinder, each associated with a respective one of said forward section and rear section, and operable jointly to apply the same extent of widthwise adjustment of successive plough bodies of each section.

11. A reversible plough according to claim 10, in which the master cylinder is incorporated into an adjustment mechanism associated with the forward section, and the slave cylinder is incorporated in an adjustment mechanism coupled with the plough bodies of the rear section.

* * * * *